(12) United States Patent
Kitayama et al.

(10) Patent No.: US 8,477,589 B2
(45) Date of Patent: Jul. 2, 2013

(54) OPTICAL PICKUP AND OPTICAL DISC DRIVE

(71) Applicants: Hitachi Consumer Electronics Co., Ltd., Tokyo (JP); Hitachi-LG Data Storage, Inc., Tokyo (JP)

(72) Inventors: Akira Kitayama, Hachioji (JP); Toshimitsu Kaku, Sagamihara (JP); Kazuhide Hamada, Tokyo (JP)

(73) Assignees: Hitachi Consumer Electronics, Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/660,384

(22) Filed: Oct. 25, 2012

(65) Prior Publication Data

US 2013/0100793 A1 Apr. 25, 2013

(30) Foreign Application Priority Data

Oct. 25, 2011 (JP) .................................. 2011-233517

(51) Int. Cl.
*G11B 7/00* (2006.01)
(52) U.S. Cl.
USPC .......................................................... 369/121

(58) Field of Classification Search
None
See application file for complete search history.

(56) References Cited

U.S. PATENT DOCUMENTS

2003/0086356 A1* 5/2003 Uchiyama et al. ............ 369/121
2004/0264315 A1* 12/2004 Kaku ......................... 369/44.34

FOREIGN PATENT DOCUMENTS

JP 2009-15998 A 1/2009
JP 2011-86336 A 4/2011

* cited by examiner

*Primary Examiner* — Paul Huber
(74) *Attorney, Agent, or Firm* — Crowell & Moring LLP

(57) ABSTRACT

A optical pickup includes: a laser diode; a driver including a first output end of a laser diode drive current; a first line electrically connected to the first output end of the driver and a first port of the laser diode; a second line provided adjacent to the signal line at at least one location or more and electrically connected to a second port of the laser diode; a printed circuit board including the first and second lines; and a metal heat dissipation cover for the driver. The first and second lines form a two layer structure in which the first and second lines are vertically disposed. The line width of the line provided close to the heat dissipation cover is wider than the line width of the other line between the first and second lines in the two layer structure.

14 Claims, 14 Drawing Sheets

OPTICAL PICKUP AND OPTICAL DISC DRIVE

CLAIM OF PRIORITY

The present application claims priority from Japanese Patent Application JP2011-233517 filed on Oct. 25, 2011, the content of which is hereby incorporated by reference into this application.

BACKGROUND OF THE INVENTION

1. Field of the Invention

The present invention relates to an optical pickup and an optical disc drive using the same, and more particularly to a reduction in electro-magnetic radiation.

2. Description of the Related Art

In an optical pickup that writes data on and reads data from a disc using a laser light beam and an optical disc drive using the same, such a problem is prone to occur in that electro-magnetic radiation and electro-magnetic interference are caused to the outside of the device in writing and reading data. In the case where the electro-magnetic radiation of the optical disc drive exceeds the limiting value defined according to the standard, the drive is not allowed to be shipped, and problems are the fundamental analysis of causes and schemes to take measures against the causes.

It is considered that a factor of electro-magnetic radiation in writing and reading data is electro-magnetic radiation in association with an LD drive current carried through a transmission line from a laser diode driver (LDD) to a laser diode (LD) in the optical pickup. The optical pickup includes at least one heat dissipation cover or more that dissipate the heat of the LDD and the LD, and the heat dissipation cover is also used for the purpose of shielding electro-magnetic radiation so as not to leak electro-magnetic radiation to the outside of the optical pickup. For a technique related to shielding electro-magnetic radiation, Japanese Patent Application Laid-Open Publication No. 2011-86336 and Japanese Patent Application Laid-Open Publication No. 2009-15998 are disclosed, for example.

SUMMARY OF THE INVENTION

In the optical disc drive in these years, writing speed is increasing more and more. The waveform of a write signal (a write strategy signal), that is, the frequency of an LD drive current becomes a higher frequency correspondingly, and the amplitude is also increasing. On the other hand, in reading data, in order to prevent a reflected light beam from a disc from returning to the output end surface of the LD to be noise (optical feedback noise), the LD is modulated at a high frequency modulation signal at a frequency of a few hundreds MHz, and light is emitted in a multimode for read. However, with an increase in read speed, the frequency component of a read signal is brought close to the frequency of the high frequency modulation signal to cause read errors. In order to prevent the read errors, the frequency of a signal to be superimposed becomes a higher frequency.

From the reasons above, in the optical disc drive in these years in which writing and reading speed is increasing, the frequency and amplitude of the signal in the drive are increasing. With these increases, an unexpected noise propagation path is formed due to stray capacitance between components and between lines, which are not in consideration so far. Moreover, since resonance and electro-magnetic radiation possibly occur in smaller physical dimensions, electro-magnetic radiation problems are prone to occur more than ever before.

On the other hand, the costs of the drive are also reducing at a feverish pace. For example, the material of an optical pickup main body, in which optical components such as an LD, a lens, and a mirror are incorporated, is changing from a conventional metal main body (an optical pickup main body 21 in FIG. 6) to a non-metal material (a resin material, for example, such as an optical pickup main body 6 in FIG. 5A). Conventionally, a metal optical pickup main body, which occupies a large volume, is used as a stable ground. The heat dissipation cover is electrically connected to the optical pickup main body at many locations (a connecting point 23 between a heat dissipation cover and an optical pickup in FIG. 6, for example) for reducing radiation efficiency (see Japanese Patent Application Laid-Open Publication No. 2009-15998). However, since the material of the optical pickup main body becomes a resin material, it is considered that the impedance of the heat dissipation cover to the ground is increased and radiation efficiency is increased. Moreover, in addition to an increase in rate doubling as a background, electro-magnetic radiation problems frequently occur.

For a typical effort to reduce electro-magnetic interference, such cut-and-try work is performed in which the shape of the heat dissipation cover is changed, conducting conditions are changed, an electromagnetic wave absorption sheet or a conductive tape (a shield) is attached around a transmission line connecting an LDD to an LD, and then the effect is measured and conformed, for example. In this case, large problems are a delay in development and costs for additionally providing components.

Therefore, it is an object of the present invention to provide an optical pickup that can reduce electro-magnetic radiation in writing and reading data at low costs and an optical disc drive using the same.

The following is an example of an aspect of addressing the problems. Namely, an optical pickup according to the present invention is an optical pickup that at least writes data on or reads data from an optical disc using a laser light beam. The optical pickup includes: an optical pickup optical system including an optical lens and an optical mirror; a flexible printed circuit disposed above the optical pickup optical system; a heat dissipation cover disposed above the flexible printed circuit; a laser diode driver configured to generate a write strategy signal or a high frequency modulation signal; a first laser diode using the write strategy signal or the high frequency modulation signal for a drive current and configured to output a laser light beam modulated based on the drive current; a first line formed on the flexible printed circuit and configured to connect a first port of the first laser diode to a port that provides a fixed potential; and a second line formed on the flexible printed circuit and configured to connect a second port of the first laser diode to an output port of the laser diode driver. The first line and the second line form a two layer structure in which the first line and the second line are faced in a vertical direction to be a stacking direction of the flexible printed circuit at at least one location or more. A line width of the line formed on the heat dissipation cover side between the first line and the second line is wider than a line width of the line formed on the optical pickup optical system side in a direction orthogonal to the stacking direction.

Moreover, an optical disc drive according to the present invention is an optical disc drive that at least writes data on or reads data from an optical disc using a laser light beam. The optical disc drive includes: an optical pickup optical system including an optical lens and an optical mirror; a flexible printed circuit disposed above the optical pickup optical system; a heat dissipation cover disposed above the flexible printed circuit; a digital signal processor configured to generate a control signal that instructs generating a write strategy signal or a high frequency modulation signal based on data to be written on or read from the optical disc; a laser diode driver configured to generate the write strategy signal or the high frequency modulation signal based on the control signal; a first laser diode using the write strategy signal or the high frequency modulation signal for a drive current and configured to output a laser light beam modulated based on the drive current; a first line formed on the flexible printed circuit and configured to connect a first port of the first laser diode to a port that provides a fixed potential; and a second line formed on the flexible printed circuit and configured to connect a second port of the first laser diode to an output port of the laser diode driver. The first line and the second line form a two layer structure in which the first line and the second line are faced in a vertical direction to be a stacking direction of the flexible printed circuit at at least one location or more. A line width of the line formed on the heat dissipation cover side between the first line and the second line is wider than a line width of the line formed on the optical pickup optical system side in a direction orthogonal to the stacking direction.

According to the aspects of the present invention, it is possible to reduce electro-magnetic radiation in writing and reading data. Moreover, since various measures taken for a reduction in electro-magnetic radiation can be omitted, the omission leads to a reduction in costs as well.

BRIEF DESCRIPTION OF THE DRAWINGS

The present invention will become fully understood from the detailed description given hereinafter and the accompanying drawings, wherein.

DETAILED DESCRIPTION OF THE INVENTION

Figure 1A:
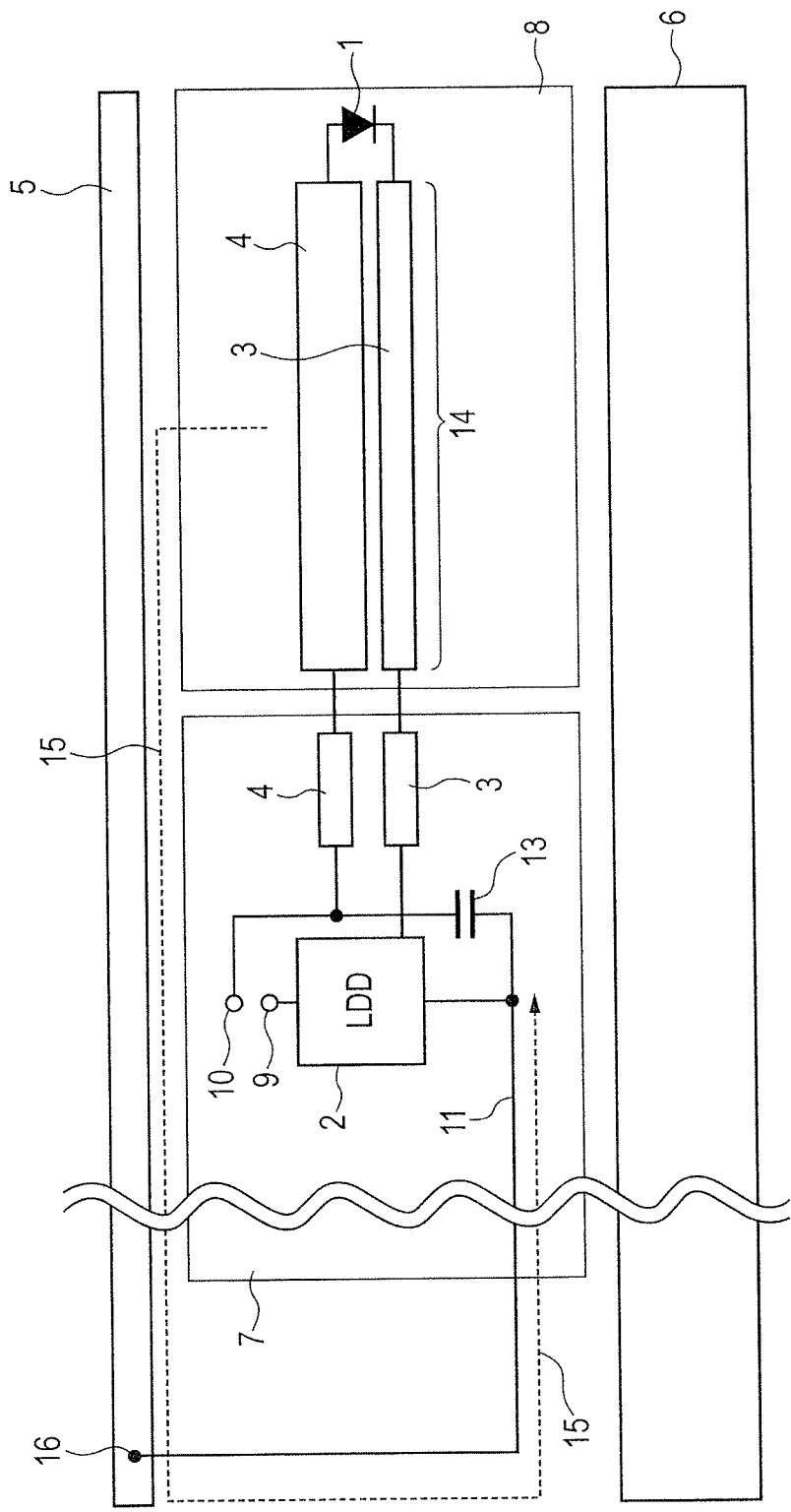
FIG. 1A is a diagram of a configuration related to transmission lines connecting an LDD to an LD in an optical pickup according to the present invention, illustrating the case where the width of a voltage supply line is wider than the width of a signal line in the two layer structure portion of the transmission lines.
Figure 1B:
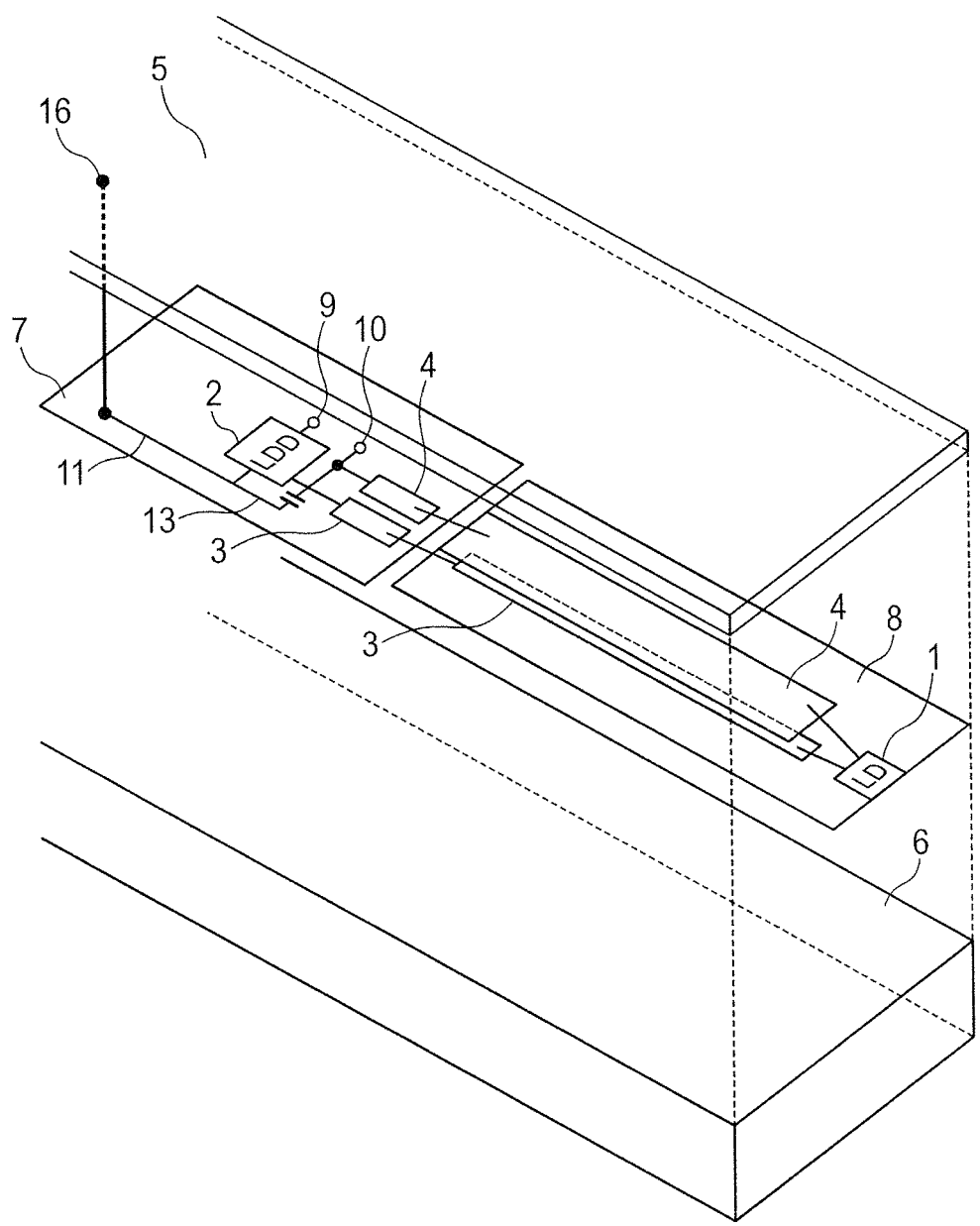
FIG. 1B is a perspective view of FIG. 1A in which the scale of the height direction is increased.

In the following, modes for carrying out the present invention are illustrated as embodiments with reference to the drawings. It is noted that portions related to the present invention are schematically illustrated in the drawings. However, members and wires not related to the present invention such as an optical lens and other circuit elements of an optical pickup, for example, are omitted appropriately. The outline is illustrated on data related to shapes and dimensions in the drawings.

First Embodiment

FIG. 1 is a diagram of a first embodiment of the present invention. A laser diode driver (LDD) 2 that drives a laser diode (LD) 1 is mounted on a first flexible printed circuit (FPC) 7, and the LD 1 is mounted on a second flexible printed circuit (FPC) 8. At least one heat dissipation cover 5 or more that dissipate the heat of the LD 1 and the LDD 2 are disposed on the upper side of the FPCs 7 and 8, and an optical pickup main body 6 made of a non-metal material (made of a resin, for example) is disposed on the lower side. Moreover, the FPCs 7 and 8 include a signal line 3 that connects the first output end of the LDD 2 to the cathode end of the LD 1 and transmits an LD electric current and a voltage supply line 4 that connects the anode end of the LD 1 to an LD drive voltage supply port 10 that supplies a sufficient ON voltage (a threshold voltage) to the LD 1, in which the voltage supply line 4 is provided adjacent to the signal line 3. Furthermore, the signal line 3 and the voltage supply line 4 have a two layer structure in which the signal line 3 and the voltage supply line 4 are vertically faced to each other at at least one location or more.

In an optical pickup and an optical disc drive using the same according to the embodiment, the voltage supply line 4 is provided on the heat dissipation cover 5 side in the two layer structure portion, and the line width of the voltage supply line 4 is extended on both sides more than the line width of the signal line 3.

It is noted that the first voltage supply port 10 connected to the voltage supply line 4, the second voltage supply port 9 that drives the LDD 2, and a ground 11 of the LDD 2 are connected to predetermined ports on the flexible printed circuits that process signals in the optical disc drive. However, configurations other than the configuration of the optical pickup are omitted here.

Moreover, since connecting pads that connect the FPC 7 to the FPC 8 and the FPC 8 to the LD 1 in the same layer are provided near the connecting points between the FPCs 7 and 8 and near the connecting point between the FPC 8 and the LD 1, the signal line 3 and the voltage supply line 4 are also provided in the same layer. However, only a two layer structure portion 14 is depicted in FIG. 1 because the wiring lengths are short.

Furthermore, the FPC 7 is a board on which members such as the LDD 2 are mounted, and a typical printed circuit board is sometimes used for the FPC 7 in the case where the board does not need to be curved or bent. Also in this case, the effect according to the embodiment is not changed at all.

In addition, although the FPC 7 and the FPC 8 are sometimes configured of a single FPC, also in this case, the effect according to the embodiment is not changed at all.

Moreover, desirably, the voltage supply line 4 on the FPC 7 is provided adjacent to the signal line 3. However, in the case where the voltage supply line 4 is short-circuited to the ground in a high frequency configuration through a bypass capacitor 13 or the like, a line to provide the ground may be provided adjacent to the signal line 3.

According to the configuration of the embodiment, it is possible to provide an optical pickup that can suppress electro-magnetic radiation at low costs and an optical disc drive using the same. The reason, that is, a mechanism that brings the effect from the configuration is shown below.

First, in the configuration according to the embodiment, the behavior of the LD drive current, which is the main factor of electro-magnetic radiation, will be described. The LD electric current is carried through a current loop passing through the output end of the LDD 2, the signal line 3, the LD 1, the voltage supply line 4, the bypass capacitor 13, and the ground 11 of the LDD. However, in the case where the FPCs 7 and 8 are provided close to the heat dissipation cover 5, it is likely that an electric current is also carried through the heat dissipation cover 5 due to electro-magnetic radiation caused by the LD electric current. Since the heat dissipation cover 5 is electrically connected to the LDD ground 11 at a contact point 16 such as a screw, the electric current coupled to the heat dissipation cover 5 is carried through a loop returning to the LDD ground 11 through a feedback current path 15.

In paths forming this current loop, the number of the connecting points 16 between the heat dissipation cover 5 and the LDD ground 11 is as small as about one to two locations generally. Thus, in the case where the impedance of the current loop with respect to the ground is high, it can also be considered that the electric current is secondarily electromagnetic-coupled to another component in the optical disc drive to form a new current loop. Since the configuration in the optical disc drive is very complicated, it is difficult to identify the secondary current loop, and it can also be said that it is difficult to identify resonance (electro-magnetic radiation) with physical dimensions of various components in the midway of the path.

Figure 1C:
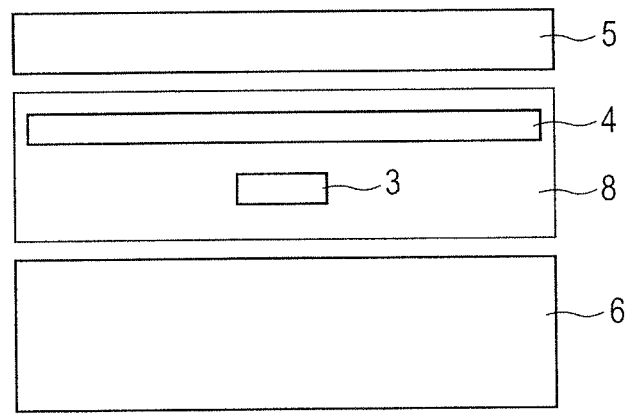
FIG. 1C is a cross sectional view of a portion where the width of the voltage supply line is wider than the width of the signal line in FIG. 1A.
Figure 5A:
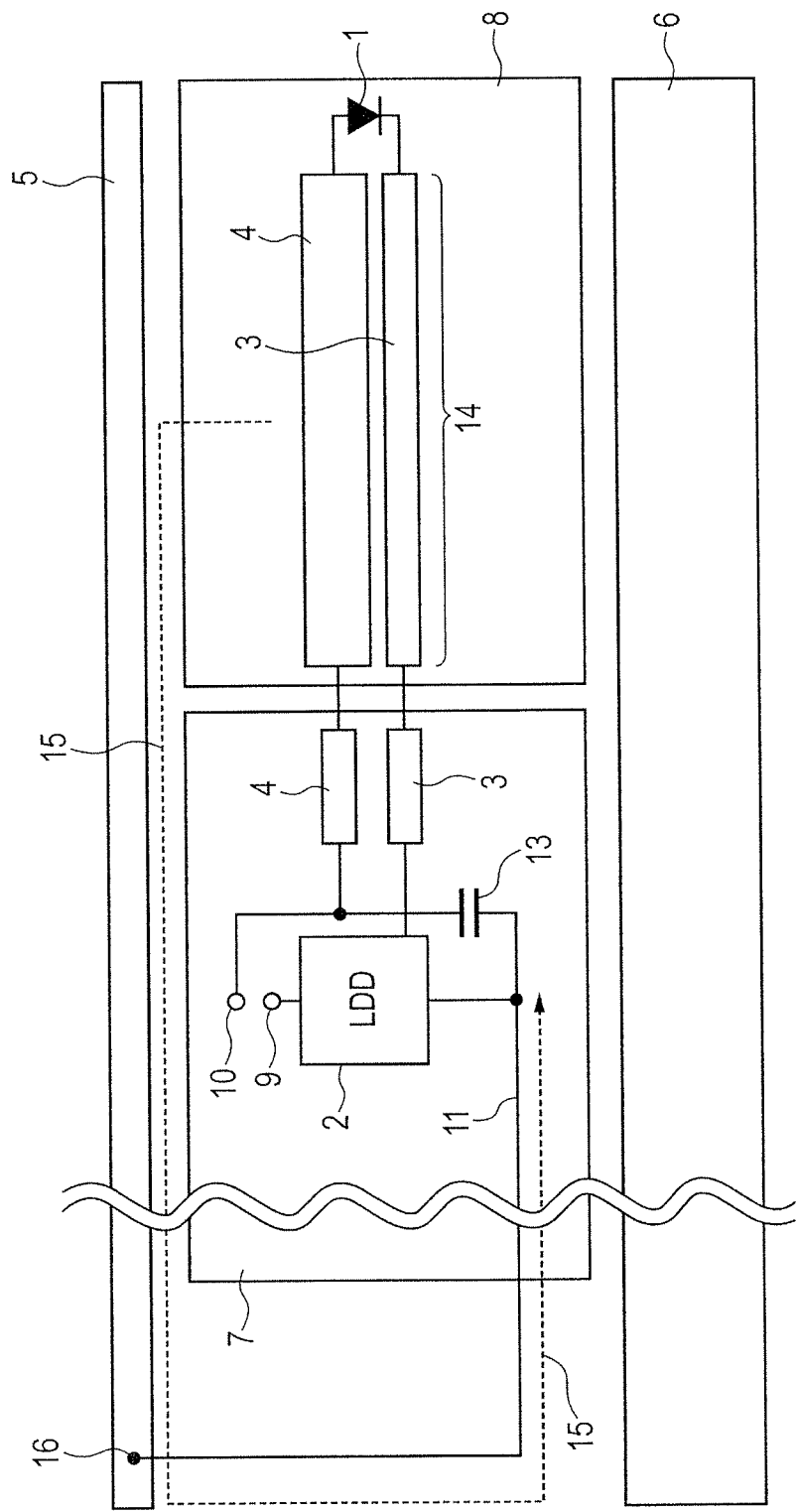
FIG. 5A is a diagram of a configuration related to transmission lines connecting an LDD to an LD in a conventional optical pickup, illustrating the case where the width of a signal line is equal to the width of a voltage supply line in the two layer structure portion of the transmission lines.
Figure 5B:
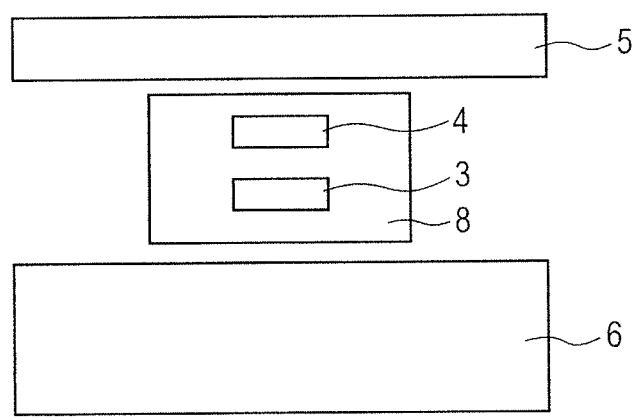
FIG. 5B is a cross sectional view in the case where the width of the signal line is equal to the width of the voltage supply line in FIG. 5A.
Figure 6:
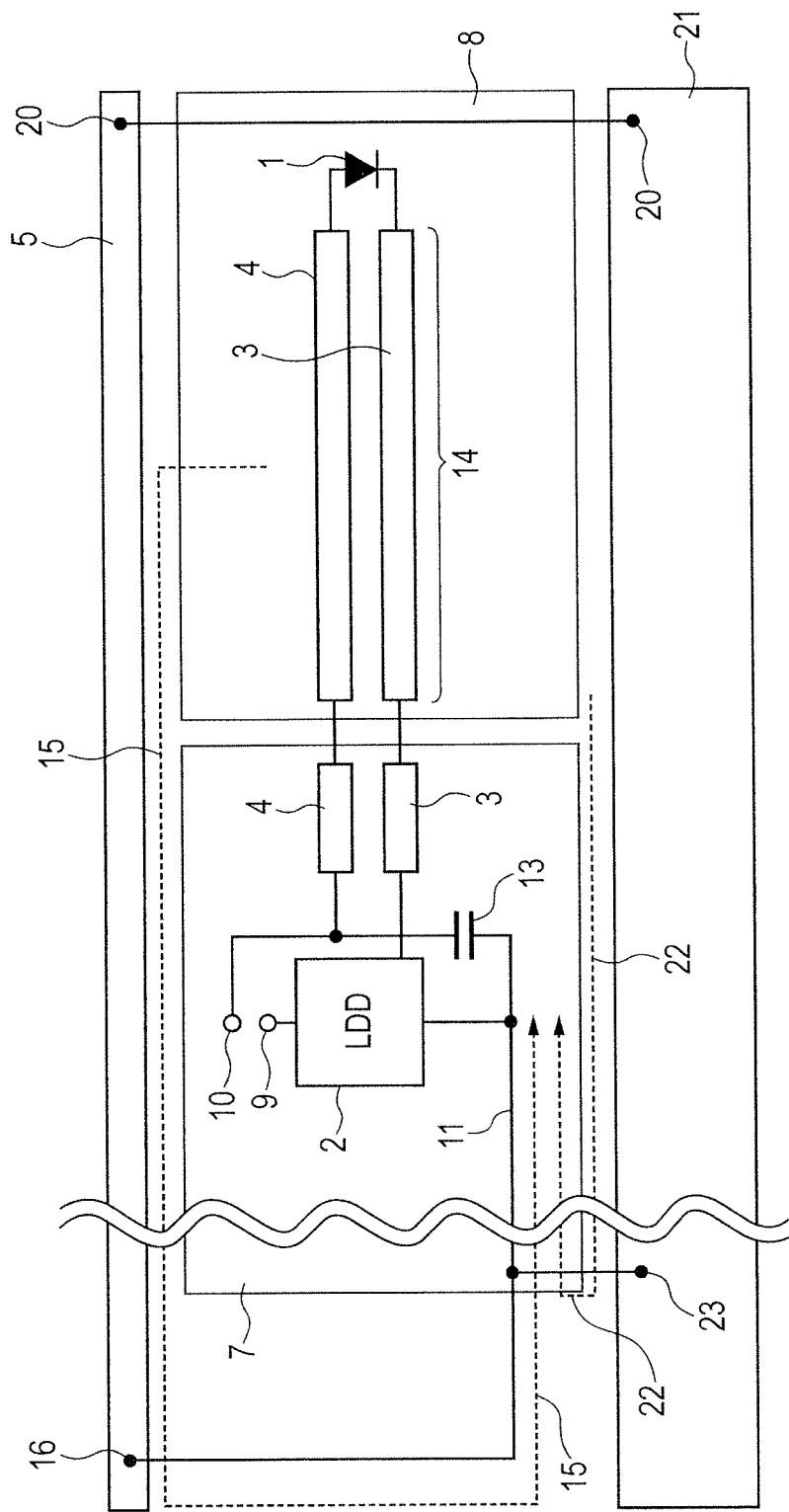
FIG. 6 is a diagram of a configuration related to transmission lines connecting an LDD to an LD in an optical pickup having a conventional metal optical pickup main body, illustrating the case where the width of a signal line is equal to the width of a voltage supply line in the two layer structure portion of the transmission lines.

Therefore, it is the most effective for a reduction in electromagnetic radiation of the optical disc drive that radiation from the transmission line is reduced or radiation to the heat dissipation cover 5 is reduced more than the confinement of electro-magnetic radiation from the transmission line in the optical pickup using a shield such as the heat dissipation cover 5. To this end, the width of the voltage supply line 4 close to the heat dissipation cover 5 was increased in the embodiment, whereas the line widths of the signal line 3 and the voltage supply line 4 of the two layer structure portion 14 were equal in the FPCs 7 and 8 in the conventional configuration (FIG. 5B). Namely, as illustrated in FIG. 1C, the line width was increased in bilateral symmetry.

Conventionally, for the background where the line widths of the signal line 3 and the voltage supply line 4 were equally designed, the optical pickup was designed under various constraints. For example, there are restrictions such as characteristic impedance to LD input impedance for pulse responses at high speed, electric current capacity for transmitting the LD drive current, strength to bending stress and to external force in association with mounting the LD, and the guideline of space saving (a smaller area) for reductions in the size and thickness of the optical pickup.

Figure 7A:
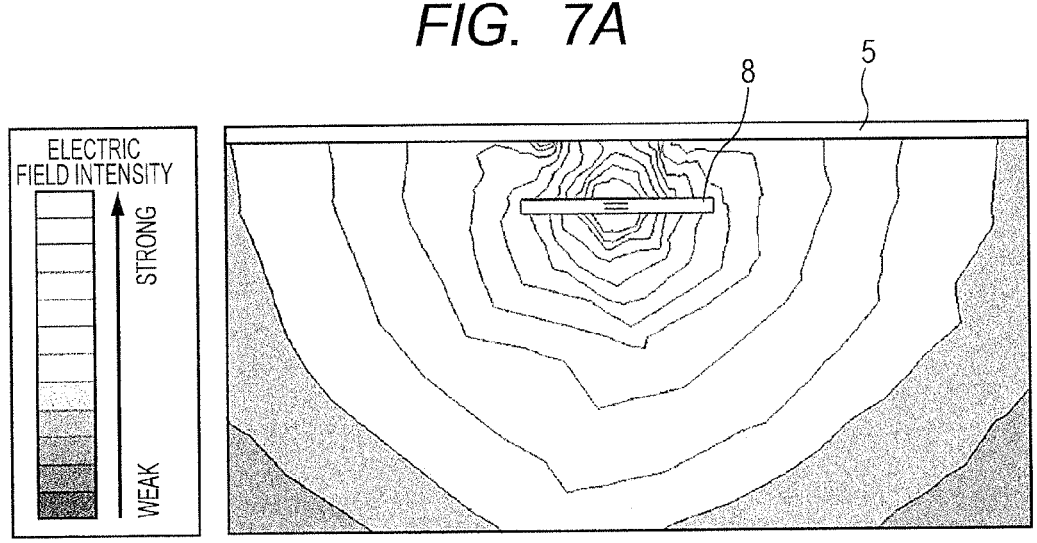
FIG. 7A is a diagram of the distribution of electric field intensity in the case where an LD drive current is carried through the signal line in the configuration in FIG. 5B.

However, since the intensity of the electro-magnetic field around the FPCs when the LD drive current is carried spreads almost concentrically in this structure, electromagnetic coupling is prone to occur in the case where a metal conductor such as the heat dissipation cover 5 is closely provided. FIG. 7A is a diagram of a result that calculates the distribution of the electric field intensity of the FPC 8 in the conventional configuration in the direction of the cross section. It can be confirmed that an electro-magnetic field spreads almost concentrically. Therefore, a strong electro-magnetic field is radiated to the heat dissipation cover 5 provided close to the FPC 8.

Figure 7B:
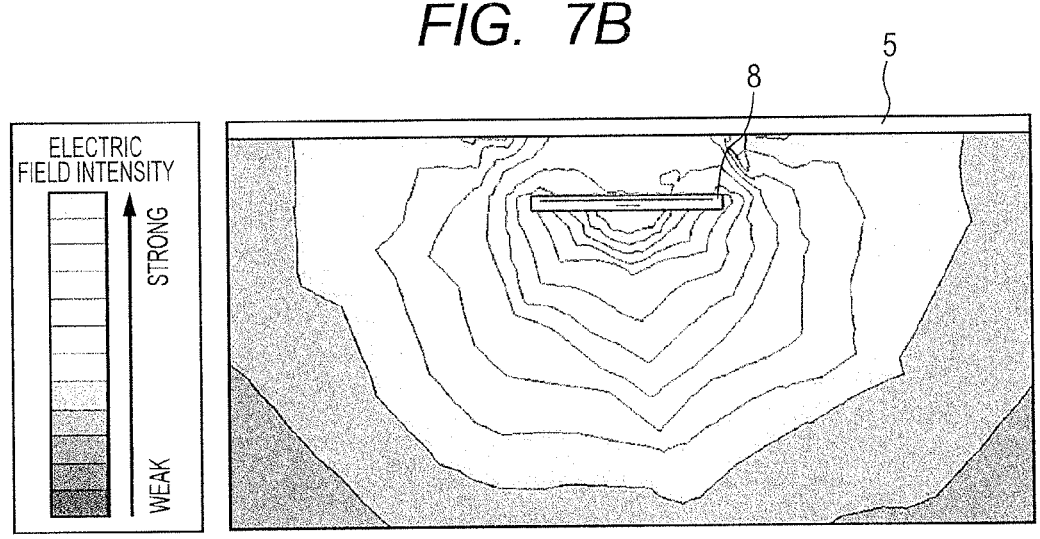
FIG. 7B is a diagram of the distribution of electric field intensity in the case where an LD drive current is carried through the signal line in the configuration in FIG. 1C.

According to the embodiment, since the distribution of the electro-magnetic field intensity can be concentrated on the opposite side of the heat dissipation cover 5 (on the optical pickup main body side), it is possible to reduce electromagnetic coupling to the heat dissipation cover 5, and it is possible to reduce the absolute quantity of an electric current eventually carried through an unpredictable electric current path passing through in the optical disc drive. FIG. 7B is a diagram of a result that calculates the distribution of the electric field intensity of the FPC 8 in the direction of the cross section to which the embodiment is applied. It can be confirmed that an electro-magnetic field spreads on the opposite side of the heat dissipation cover 5. Namely, there is the effect that the electro-magnetic field intensity radiated to the heat dissipation cover 5 can be reduced more than in the case of FIG. 7A.

It is noted that since a change in characteristic impedance caused by increasing the width of the voltage supply line 4 is smaller than individual differences between LDs, it is confirmed that there is no problem on the point of impedance matching, that is, the quality of an LD electric current waveform. Moreover, although reliability is varied depending on the materials of FPCs or manufacture vendors, the deterioration of reliability such as a reduction in bending performance caused by stress leads to no problem when the line width is below a certain line width, so that the structure according to the embodiment can be adopted by increasing the width is increased in the range.

Next, in order to confirm the effect according to the embodiment, the details of changing the dimensions of the signal line 3 and the voltage supply line 4 and the effect of a reduction in electro-magnetic radiation in association with the change will be described based on the result of an experiment originally conducted by the inventors with reference to specific examples. It is noted that numeric values shown here are merely examples, and the present invention is not necessarily limited thereto.

Figure 8A:
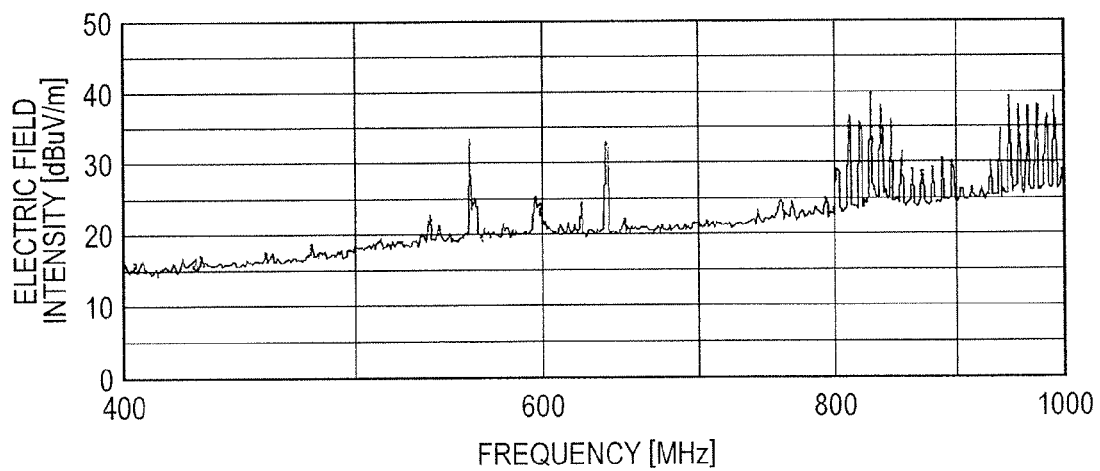
FIG. 8A is a diagram of a result that the frequency distribution of electric field intensity is measured based on the ten-meter method in the case where data is written on a 16× Blu-ray Disc in an optical pickup and an optical disc drive using the same as in the conventional configuration.

For electro-magnetic radiation in the case where data was written on a 16×BD (Blu-ray (registered trademark) Disc) using a conventional optical pickup and an optical disc drive using the same, electric field intensity was measured according to the ten-meter method defined by the standard based on the Radio Low (CISPR, for example), and a result was obtained as electric field intensity of 39 dBµV/m at the maximum as illustrated in FIG. 8A. The widths of the signal line 3 and the voltage supply line 4 in the two layer structure portion are 300 µm, and it can be considered that the spectrum of radiation observed in the measurement is due to the electromagnetic radiation described above.

It is noted that the reason why the measured result shown in FIG. 8A is distributed in a wide band is as follows. Namely, there are some methods for writing an optical disc. The writing method in the experiment conducted this time is called the CAV (Constant Angular Velocity) method, in which the angular velocity of rotation of the disc is constant and the writing speed is continuously increased (the clock frequency becomes a high frequency) as writing is advancing from the inner track to the outer track of the disc. In the case of writing data on a 16×BD according to the CAV method, since the frequency is changed from a frequency of about 400 MHz (on the innermost track) to a frequency of 1,056 MHz (on the outermost track), the spectral distribution is observed as the frequency is swept as illustrated in FIG. 8A.

Figure 8B:
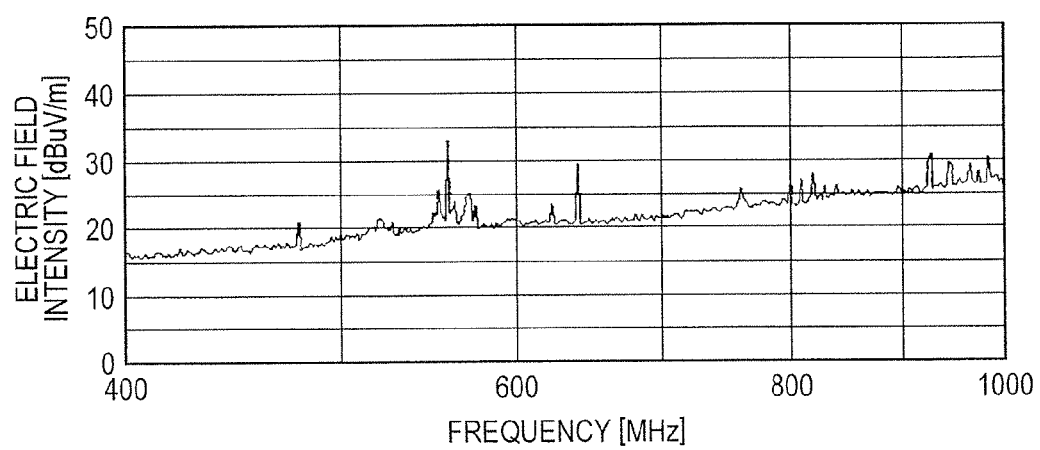
FIG. 8B is a diagram of a result that the frequency distribution of electric field intensity is measured based on the ten-meter method in the case where data is written on a 16× Blu-ray Disc in an optical pickup and an optical disc drive using the same as in a configuration to which the present invention is applied.

Subsequently, an experiment was similarly conducted on an optical pickup and an optical disc drive to which the configuration according to the embodiment was applied. More specifically, the width of the voltage supply line 4 close to the heat dissipation cover 5 was set about 2 mm in the FPC 8, and the other conditions were exactly the same as the conditions described above. As a result, as illustrated in FIG. 8B, the maximum electric field intensity was reduced to 32 dBµV/m, and it was confirmed that electro-magnetic radiation can be reduced by applying the embodiment.

From the description above, the line width of the voltage supply line 4 close to the heat dissipation cover 5 is made wider than the line width of the signal line 3 between the signal line 3 and the voltage supply line 4 in the two layer structure portion, so that it is possible to reduce electromagnetic coupling to the heat dissipation cover 5. As a result, electro-magnetic radiation from the optical disc drive itself can be reduced and measures against electro-magnetic radiation can be taken without any additional members, so that it is possible to provide an optical pickup and an optical disc drive that can reduce electro-magnetic radiation at low costs.

It is noted that as described above, although the value of the line width has restriction because of stress, a wider width allows electro-magnetic field to be concentrated on the opposite side of the heat dissipation cover 5, so that it is possible to obtain the effect of reducing electro-magnetic radiation.

Moreover, the value of a wider line width of the voltage supply line 4 does not need to be constant, and the effect of reducing electro-magnetic radiation can also be obtained as the line width is freely changed for wiring. However, a line as wide as possible is preferable as described above.

Furthermore, as illustrated in FIG. 1C, the voltage supply line 4 with a widened line width is increased in the line width with respect to the signal line 3 in good lateral balance, so that it is possible to efficiently obtain the effect of reducing electro-magnetic radiation.

Figure 1D:
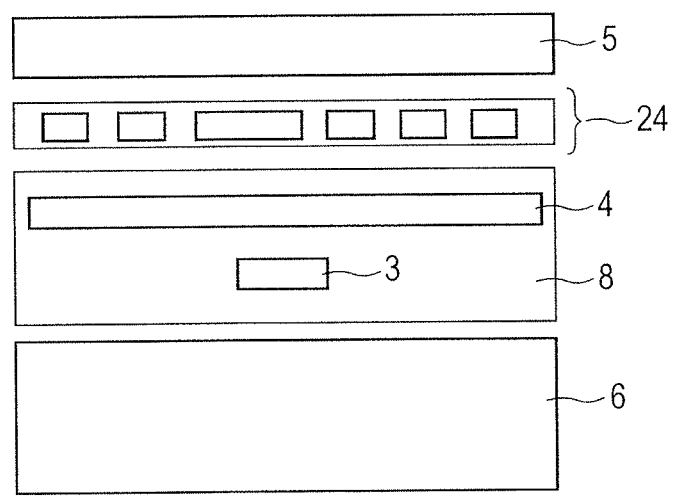
FIG. 1D is a cross sectional view of a portion where a wiring layer is formed above the voltage supply line in FIG. 1C.

In addition, nothing is disposed between the FPC 8 and the heat dissipation cover 5 in FIG. 1C. For example, it is apparent that the similar effect can be obtained in such a configuration in which a third FPC, a wire 24 of the third FPC, and a wiring board such as the FPC 7 are disposed between the FPC 8 and the heat dissipation cover 5 as illustrated in FIG. 1D, when the line width of the voltage supply line 4 close to the heat dissipation cover 5 is made wider.

Second Embodiment

Figure 2:
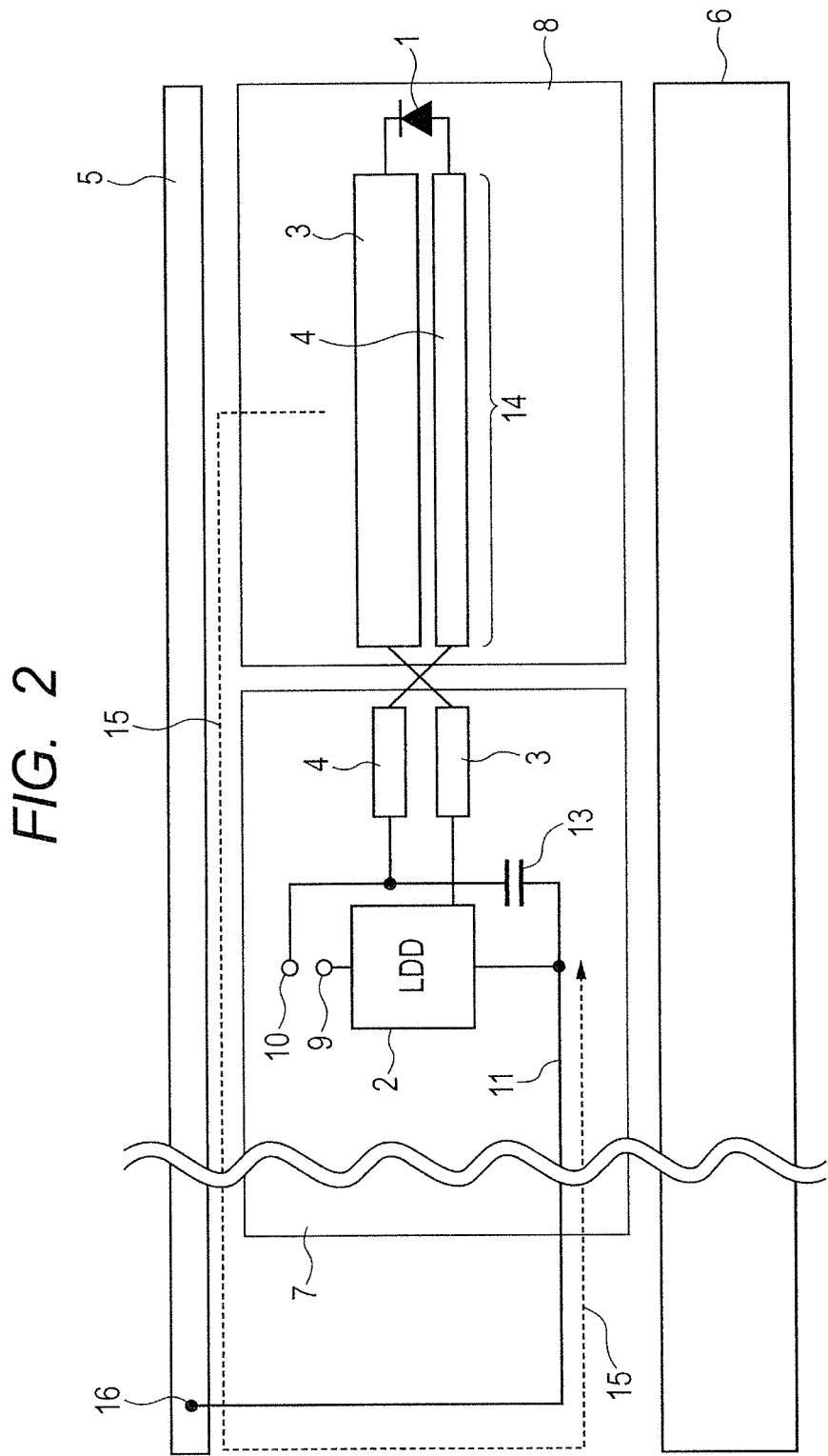
FIG. 2 is a diagram of a configuration related to transmission lines connecting an LDD to an LD in an optical pickup according to the present invention, illustrating the case where the width of a signal line is wider than the width of a voltage supply line in the two layer structure portion of the transmission lines.

A second embodiment of the present invention is illustrated in FIG. 2. FIG. 2 illustrates the two layer structure portion of the optical pickup illustrated in FIG. 1, in which a signal line 3 is disposed on the heat dissipation cover 5 side and the line width of the signal line 3 is wider than the line width of a voltage supply line 4.

According to the embodiment, the distribution of the intensity of an electro-magnetic field generated in the case where an LD drive current is carried through the signal line 3 is concentrated on the opposite side of a heat dissipation cover 5, so that it is possible to reduce coupling to the heat dissipation cover 5. Moreover, the characteristic impedance of a two layer structure portion 14 is the same as in the configuration of the first embodiment, so that it is possible to implement the second embodiment without degrading the quality of an LD drive current waveform. The reason why the foregoing effect can be obtained is the same as the first embodiment.

Third Embodiment

Figure 3:
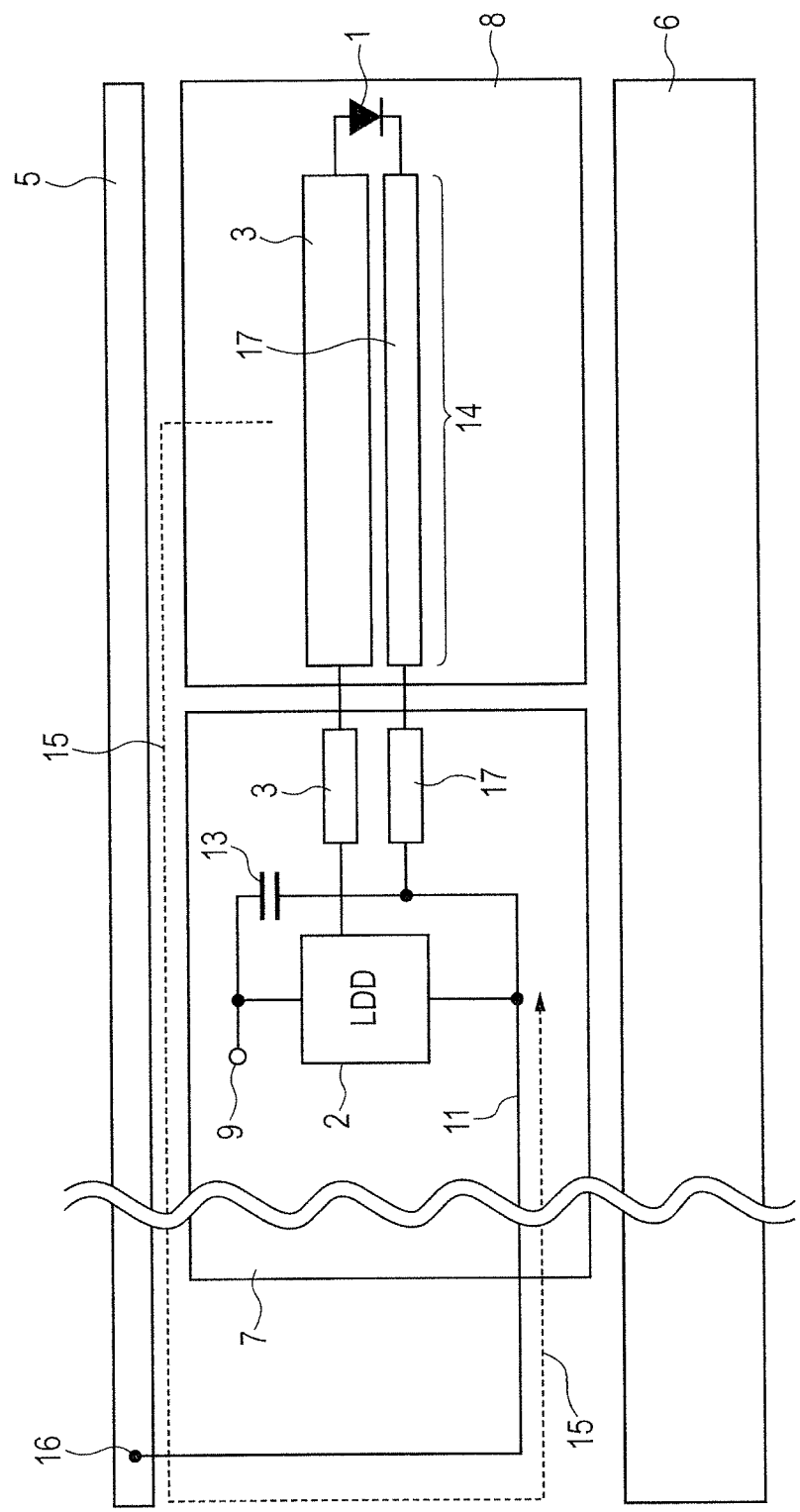
FIG. 3 is a diagram of a configuration related to transmission lines connecting an LDD to an LD in an optical pickup according to the present invention, illustrating the case where the width of a ground line is wider than the width of a signal line in the two layer structure portion of the transmission lines.

A third embodiment of the present invention is illustrated in FIG. 3. An LDD 2 that drives an LD 1 is mounted on an FPC 7, and the LD 1 is mounted on an FPC 8. At least one heat dissipation cover 5 or more that dissipate the heat of the LD 1 and the LDD 2 are disposed on the upper side of the FPCs 7 and 8, and an optical pickup main body 6 made of a non-metal material (made of a resin, for example) is disposed on the lower side. Moreover, the FPCs 7 and 8 are provided with a signal line 3 that connects the first output end of the LDD 2 to the anode end of the LD 1 and transmits an LD drive current and a ground line 17 connected to the cathode end of the LD 1 for providing a ground to the LDD 2, in which the ground line 17 is provided adjacent to the signal line 3. Furthermore, the signal line 3 and the ground line 17 form a two layer structure in which the signal line 3 and the ground line 17 are disposed as vertically faced to each other at at least one location or more. The width of the signal line 3 is wider than the width of the ground line 17 in a two layer structure portion 14 in the FPC 8. In addition, an LDD drive voltage supply port 9 is connected to the power supply input port of the LDD 2, and further connected to the ground line 17 through a bypass capacitor 13 disposed near the LDD 2. The other components are the same as in the first and second embodiments.

With the application of the configuration according to the embodiment, the distribution of the intensity of an electromagnetic field generated in the case where the LD drive current is carried through the signal line 3 is concentrated on the opposite side of the heat dissipation cover 5, so that it is possible to reduce coupling to the heat dissipation cover 5. The reason why the foregoing effect can be obtained is the same as the first and second embodiments.

Moreover, as in the second embodiment with respect to the first embodiment, the equivalent effect can also be obtained in the configuration in which the ground line 17 is disposed on the heat dissipation cover side and the line width of the ground line 17 is made wider than the line width of the signal line 3 in the two layer structure portion 14 in the FPC 8. This reason is also exactly the same as the reason described in the second embodiment.

It is noted that the LD 1 in the embodiment is represented by an LD for a CD or DVD (at wavelengths of 600 to 800 nm). The ON voltage is a voltage of about 2 V, and the differential resistance value is about 4Ω; the values are small. Therefore, even though the LD 1 is driven at a current of a few hundreds milliamperes, a sufficient driving force can be secured for the LDD 2 operated at a voltage of 5 V, so that a drive current is inputted to the anode side and a ground is provided to the cathode side.

On the other hand, the LD 1 in the first and second embodiments is represented by an LD for a BD (at a wavelength of about 400 nm). The ON voltage is a voltage of about 3V, and the differential resistance value is about 10 to 40Ω; the values are high. Thus, in the case where the LD 1 is driven at a current of a few hundreds milliamperes, it is difficult to secure a sufficient driving force for the LDD 2 operated at a voltage of 5 V. Therefore, power is externally supplied to the anode side, and a drive current is inputted to the cathode side.

Fourth Embodiment

Figure 4A:
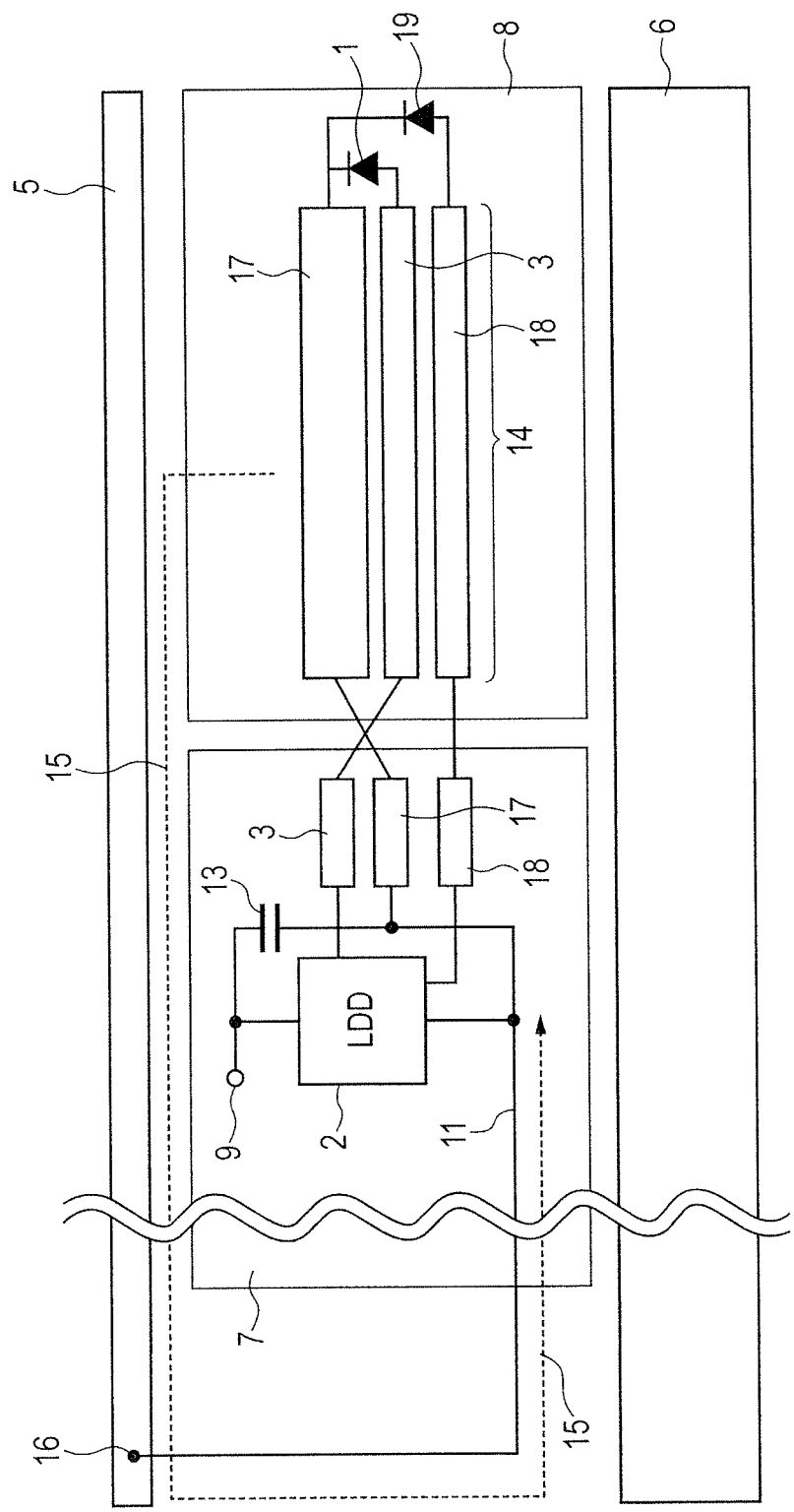
FIG. 4A is a diagram of a configuration related to transmission lines connecting an LDD to a first LD and a second LD in an optical pickup according to the present invention, illustrating the case where the line width of a ground line is wider than the sum of the widths of a first signal line and a second signal line and a gap between the first signal line and the second signal line in the two layer structure portion of the transmission lines.
Figure 4B:
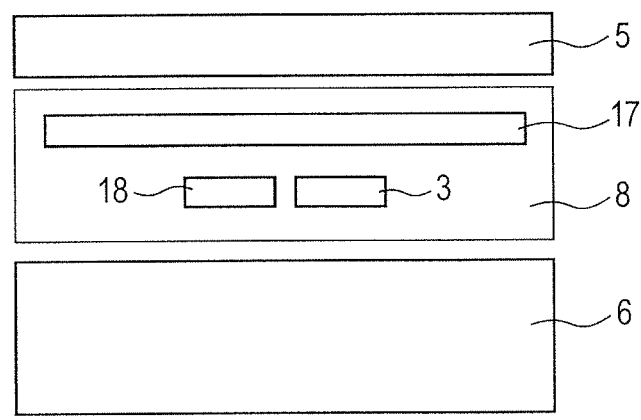
FIG. 4B is a cross sectional view of a portion where the width of the voltage supply line is wider than the width of the signal line in FIG. 4A.

FIG. 4 is a diagram of a fourth embodiment of the present invention. An LDD 2 that drives an LD 1 and an LD 19 is mounted on an FPC 7, and the LD 1 and the LD 19 are mounted on an FPC 8. At least one heat dissipation cover 5 or more that dissipate the heat of the LD 1, the LD 19, and the LDD 2 are disposed on the upper side of the FPCs 7 and 8, and an optical pickup main body 6 made of a non-metal material (made of a resin, for example) is disposed on the lower side. Moreover, the FPCs 7 and 8 are provided with a signal line 3 that connects the first output end of the LDD 2 to the anode end of the LD 1 and transmits an LD drive current, a signal line 18 that connects the second output end of the LDD 2 to the anode end of the LD 19 and transmits the LD drive current, and a ground line 17 connected to the cathode end of the LD 1 and the cathode end of the LD 19 for supplying a ground to the LDD 2, in which the ground line 17 is provided adjacent to the signal line 3 and the signal line 18. Moreover, the signal line 3 and the signal line 18 form a two layer structure in which the signal line 3 and the signal line 18 are vertically faced to the ground line 17 at at least one location or more. In the two layer structure portion 14 in the FPC 8, the line width of the ground line 17 is wider than a dimension of the sum of the line widths of the signal line 3 and the signal line 18 and a gap between the signal line 3 and the signal line 18. The other components are the same as in the first and second embodiments.

With the application of the configuration according to the embodiment, the distribution of the intensity of an electromagnetic field generated in the case where an electric current that drives the LD 1 is carried through the signal line 3 and in the case where an electric current that drives the LD 19 is carried through the signal line 18 is concentrated on the opposite side of the heat dissipation cover 5, so that it is possible to reduce coupling to the heat dissipation cover. The reason why the foregoing effect can be obtained is the same as the first embodiment.

Fifth Embodiment

Figure 9A:
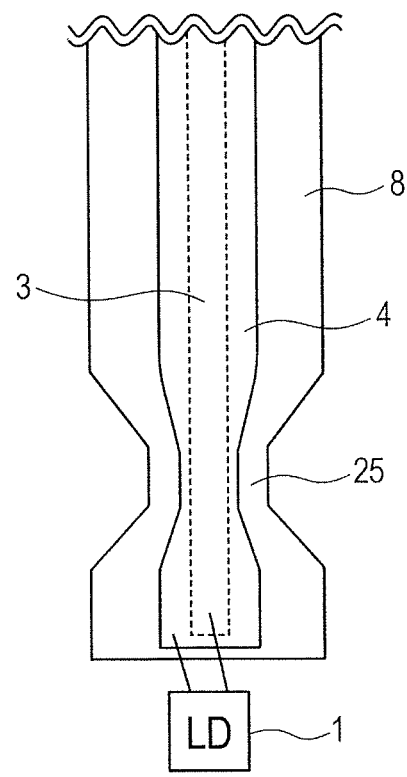
FIG. 9A is a diagram of a portion in which the width of a voltage supply line is made narrower in a bent portion than in the other portions and wider than the width of a signal line on a flexible printed circuit in a two layer structure on which the LD of the optical pickup according to the present invention is mounted.
Figure 9B:
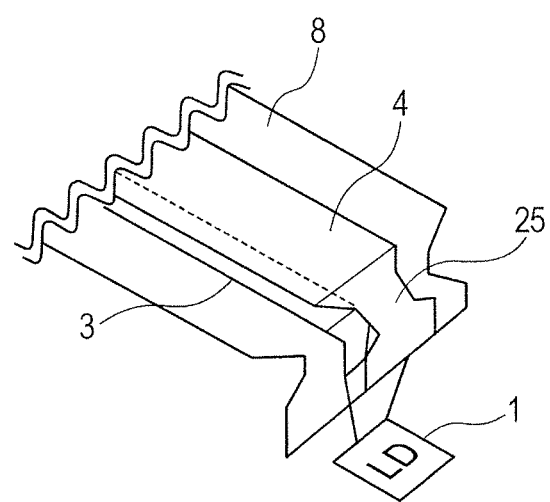
FIG. 9B is a perspective view of FIG. 9A.

A fifth embodiment of the present invention is illustrated in FIGS. 9A and 9B. FIG. 9A is the top face portion of a second FPC 8 in the two layer structure portion of the optical pickup illustrated in FIG. 1. FIG. 9B is a perspective view. Since an LD 1 is three-dimensionally disposed on the mounting surface of an LDD 2 or the like, the FPC 8 includes a bent portion 25. FIGS. 9A and 9B illustrate that the line width of a ground line 4 is made narrower in this portion than the line width in the other portions, and the line width is wider than the line width of a signal line 3.

According to the embodiment, the distribution of the intensity of an electro-magnetic field generated in the case where an LD drive current is carried through the signal line 3 is concentrated on the opposite side of a heat dissipation cover 5, so that it is possible to reduce coupling to the heat dissipation cover 5. Moreover, since stress is reduced in the bent portion of the FPC 8, it is advantageous that the effect described above can also be obtained while maintaining reliability. The reason why the foregoing effect can be obtained is the same as the first embodiment.

Furthermore, the effect to be obtained is the same as in the embodiment even in the case where the signal line 3 and the ground line 4 are provided as in the second embodiment and in the case where the signal line 3 and the ground line 4 are provided as in the third and fourth embodiments.

In addition, the embodiment can be implemented at a plurality of locations. The effect similar to the description above can be obtained by implementing the embodiment on any curved portions or bent portions.

Figure 10:
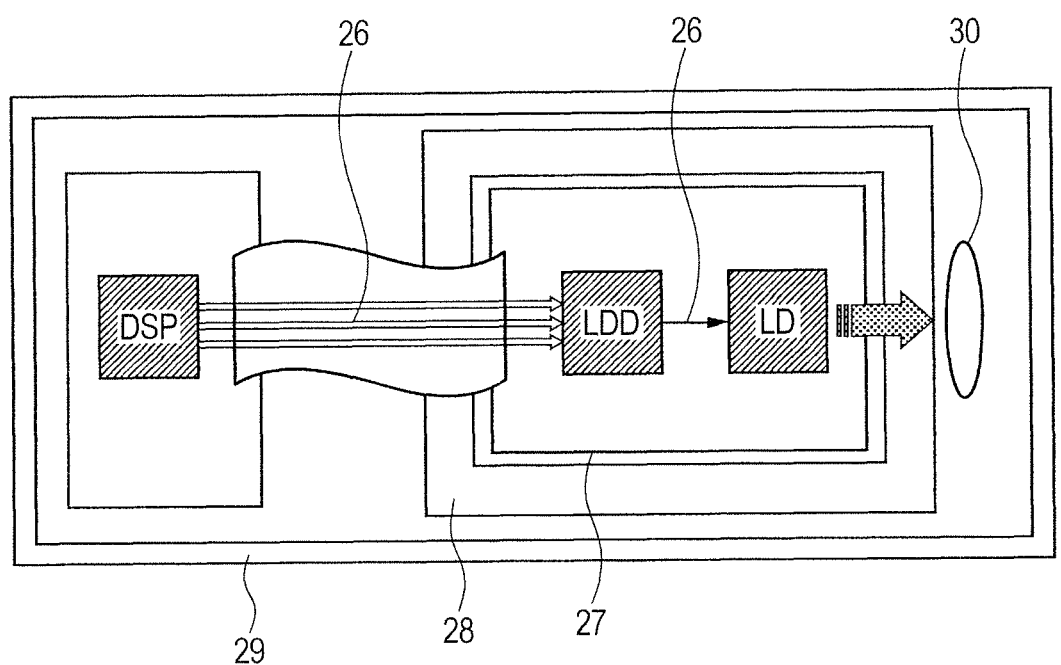
FIG. 10 is a block diagram of an entire optical disc drive according to the present invention.

Lastly, FIG. 10 is a block diagram of the entire optical disc drive according to the present invention. A digital signal processor (DSP) generates data of a write strategy signal that modulates a laser light beam to write data on a disc, and digitally converts and outputs the data. The outputted data of the write strategy signal is transmitted to the LDD through a transmission line 26. The low voltage differential signaling (LVDS) method is often used for signals communicating here. The LDD converts a signal from the DSP in an analog manner, that is, the LDD converts the signal into a write strategy signal, and outputs the signal as a drive current for the LD. The LD applies a laser light beam according to the drive current, and writes data on an optical disc.

The single end method or the like is used for the transmission line 26 where the LDD is connected to the LD, and the present invention is applied to reduce electro-magnetic radiation to the heat dissipation cover formed above the transmission line 26. Moreover, since the amount of an electric current carried through the optical disc drive caused by electro-magnetic radiation to the heat dissipation cover can also be reduced, resonance caused by the physical dimensions of the structure of the optical disc drive (such as a chassis 28 and a cover 29), that is, electro-magnetic radiation can also be reduced, and it is possible to provide an optical disc drive with a small electro-magnetic radiation. Furthermore, it is likely that the electric current carried through the optical disc drive caused by the electro-magnetic radiation to the heat dissipation cover leads to malfunctions because the electric current might leak to other chips, signal interconnections, power supply interconnections, or the like. However, the present invention is applied to reduce the risks of malfunctions.

It is noted that the configuration illustrated in FIG. 10 is the configuration of a typical optical disc drive. The embodiment is also applicable to optical disc drives in other configurations for obtaining the similar effect.

As described above, according to the embodiments of the present invention, it is possible to provide an optical pickup that can reduce electro-magnetic radiation at low costs and an optical disc drive using the same.

What is claimed is:

1. An optical pickup that at least writes data on or reads data from an optical disc using a laser light beam, the optical pickup comprising:
   an optical pickup optical system including an optical lens and an optical mirror;
   a flexible printed circuit disposed above the optical pickup optical system;
   a heat dissipation cover disposed above the flexible printed circuit;
   a laser diode driver configured to generate a write strategy signal or a high frequency modulation signal;
   a first laser diode using the write strategy signal or the high frequency modulation signal for a drive current and configured to output a laser light beam modulated based on the drive current;
   a first line formed on the flexible printed circuit and configured to connect a first port of the first laser diode to a port that provides a fixed potential; and
   a second line formed on the flexible printed circuit and configured to connect a second port of the first laser diode to an output port of the laser diode driver, wherein:
   the first line and the second line form a two layer structure in which the first line and the second line are faced in a vertical direction to be a stacking direction of the flexible printed circuit at at least one location or more; and
   a line width of the line formed on the heat dissipation cover side between the first line and the second line is wider than a line width of the line formed on the optical pickup optical system side in a direction orthogonal to the stacking direction.

2. The optical pickup according to claim 1, wherein:
   the two layer structure includes a bent portion bent or curved along a case in which a casing of the optical pickup optical system is accommodated; and
   the bent portion of the flexible printed circuit is formed narrower than a portion where the first line and the second line are formed and the bending or the curve is not provided.

3. The optical pickup according to claim 1, wherein:
   the optical pickup further includes:
   a second laser diode configured to output a laser light beam modulated based on a drive current; and
   a third line formed on the flexible printed circuit and configured to connect a first port of the second laser diode to the output port of the laser diode driver;
   a second port of the second laser diode is connected to the first line;
   the first line and the third line form a two layer structure in which the first line and the third line are faced in a vertical direction to be the stacking direction of the flexible printed circuit;
   the third line is formed in a layer in which the second line is formed on the flexible printed circuit; and
   a width of the first line is wider than a sum of a width of the second line, a width of the third line, and a gap between the second line and the third line.

4. The optical pickup according to claim 1, wherein:
   when the first port of the first laser diode is an anode, a port to provide the fixed potential is a voltage supply port; and
   when the first port of the first laser diode is a cathode, a port to provide the fixed potential is a ground port.

5. The optical pickup according to claim 1, wherein a material of the casing that accommodates the optical pickup optical system is a non-metal material.

6. The optical pickup according to claim 1, wherein a material of the heat dissipation cover is a metal material.

7. The optical pickup according to claim 1, wherein the heat dissipation cover is electrically connected to a ground wire for the laser diode driver at at least one location or more.

8. An optical disc drive that at least writes data on or reads data from an optical disc using a laser light beam, the optical disc drive comprising:
   an optical pickup optical system including an optical lens and an optical mirror;
   a flexible printed circuit disposed above the optical pickup optical system;
   a heat dissipation cover disposed above the flexible printed circuit;
   a digital signal processor configured to generate a control signal that instructs generating a write strategy signal or a high frequency modulation signal based on data to be written on or read from the optical disc;
   a laser diode driver configured to generate the write strategy signal or the high frequency modulation signal based on the control signal;
   a first laser diode using the write strategy signal or the high frequency modulation signal for a drive current and configured to output a laser light beam modulated based on the drive current;
   a first line formed on the flexible printed circuit and configured to connect a first port of the first laser diode to a port that provides a fixed potential; and
   a second line formed on the flexible printed circuit and configured to connect a second port of the first laser diode to an output port of the laser diode driver, wherein:
   the first line and the second line form a two layer structure in which the first line and the second line are faced in a vertical direction to be a stacking direction of the flexible printed circuit at at least one location or more; and
   a line width of the line formed on the heat dissipation cover side between the first line and the second line is wider than a line width of the line formed on the optical pickup optical system side in a direction orthogonal to the stacking direction.

9. The optical disc drive according to claim 8, wherein:
   the two layer structure includes a bent portion bent or curved along a case in which a casing of the optical pickup optical system is accommodated; and
   the bent portion is formed narrower than a portion where the first line and the second line are formed and the bending or the curve is not provided.

10. The optical disc drive according to claim 8, wherein:
    the optical pickup further includes:
    a second laser diode configured to output a laser light beam modulated based on a drive current; and
    a third line formed on the flexible printed circuit and configured to connect a first port of the second laser diode to the output port of the laser diode driver;

a second port of the second laser diode is connected to the first line;

the first line and the third line form a two layer structure in which the first line and the third line are faced in a vertical direction to be the stacking direction of the flexible printed circuit;

the third line is formed in a layer in which the second line is formed on the flexible printed circuit; and a width of the first line is wider than a sum of a width of the second line, a width of the third line, and a gap between the second line and the third line.

11. The optical disc drive according to claim 8, wherein:

when the first port of the first laser diode is an anode, a port to provide the fixed potential is a voltage supply port; and when the first port of the first laser diode is a cathode, a port to provide the fixed potential is a ground port.

12. The optical disc drive according to claim 8, wherein a material of the casing that accommodates the optical pickup optical system is a non-metal material.

13. The optical disc drive according to claim 8, wherein a material of the heat dissipation cover is a metal material.

14. The optical disc drive according to claim 8, wherein the heat dissipation cover is electrically connected to a ground wire for the laser diode driver at at least one location or more.

\* \* \* \* \*